United States Patent Office 3,087,439
Patented Apr. 30, 1963

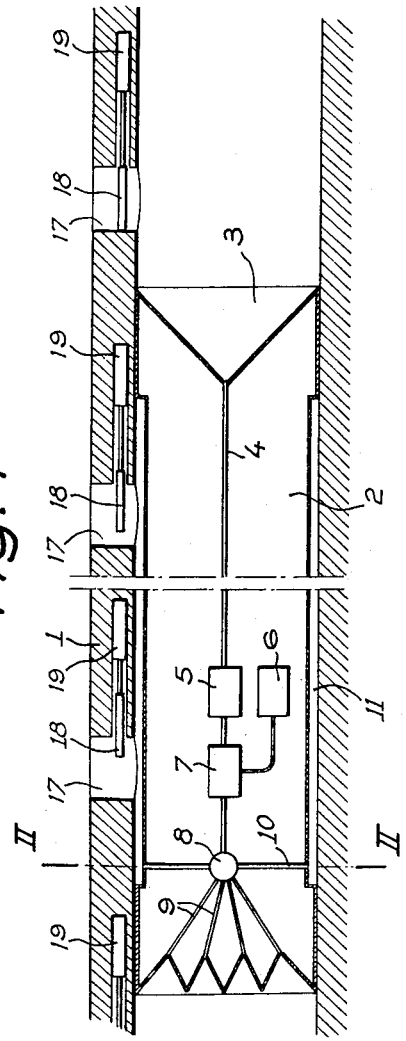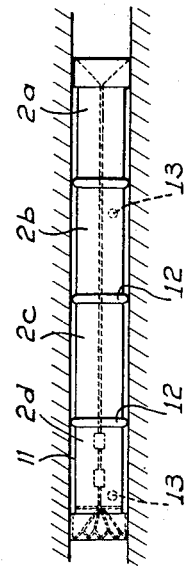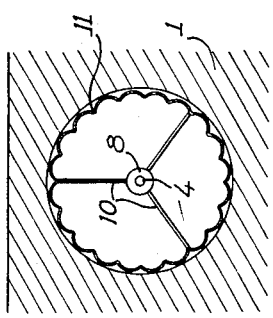

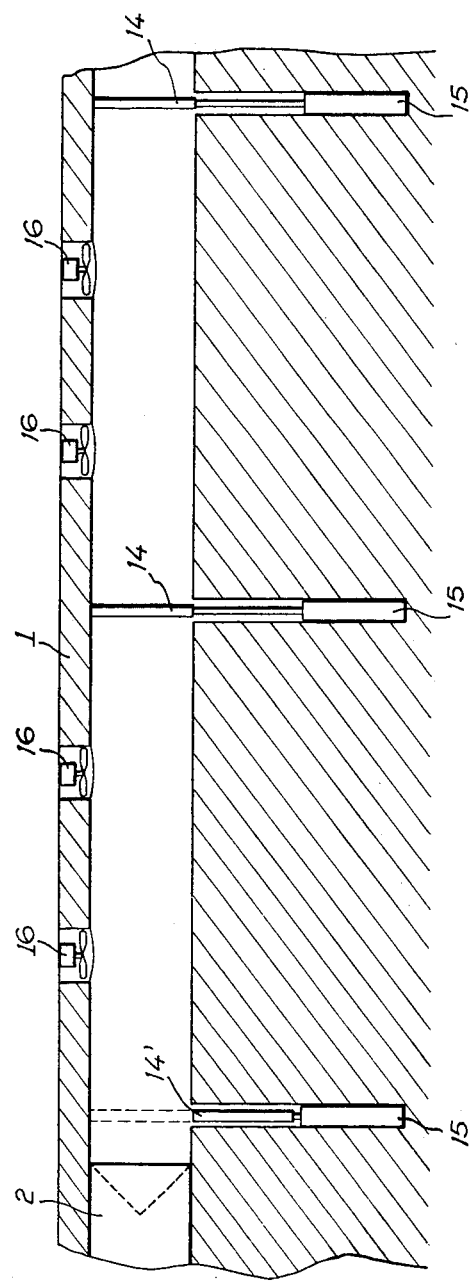

3,087,439
CONVEYANCE SYSTEM
Denis Dimitri Petrocokino, 11 Bis Ave. Victor Hugo,
Paris, France
Filed Nov. 30, 1959, Ser. No. 856,060
Claims priority, application France Dec. 4, 1958
5 Claims. (Cl. 104—138)

This invention relates to high-speed conveyance systems of the type in which a vehicle is guided and propelled through a continuous tube or tunnel, with the vehicle and tube having substantially similar cross sectional contours.

It is a broad object of this invention to provide an improved high-speed conveyance system which will be safe and reliable and efficient in use while being capable of attaining extremely high velocities. An object is to provide such a conveyance system for use both above ground and underground.

It has already been proposed in the past to construct a conveyance system comprising a continuous tube or tunnel and a vehicle or train of vehicles having substantially a similar outer cross section to the inner cross section of the tube, guided therein and propelled therethrough by suitable power means. However, all such prior proposals did not apparently contemplate the attainment by the proposed vehicle of speeds greatly in excess of conventional railroad speeds, so that the project did not evoke inordinate interest, nor were any particular difficulties in design anticipated at such moderate speeds. With the development in recent years of novel propelling systems and novel propellants in connection with aviation and rocketry the idea of such a tubular conveyance system may well acquire greatly heightened importance since it would provide a safe means of land transport at speeds approaching those of current air transport, say from 360 to 720 kilometers per hour or more. For obvious safety reasons such speeds can only be contemplated for commercial land vehicles when enclosed in a continuous tubing.

However, when a vehicle is propelled through a sealed tunnel at velocities within the range just mentioned, an unexpected difficulty arises which is not present, at any rate to an extent liable to be troublesome, at the lower velocities contemplated heretofore. This is the fact that the high-speed vehicle pushed through the tunnel and in substantially sealing engagement with the sides of the tunnel acts exactly as a piston or ram, compressing ahead of it a mass of air at very high pressure which opposes high resistance to further advance of the vehicle. It is an object of this invention to eliminate this difficulty.

This object is achieved by the provision of means for sucking in air from a point ahead of the advancing vehicle and expelling at least a major part of it at a point behind the vehicle.

Another object of the invention is to "float" the vehicle, when moving above a predetermined speed, in an annular cushion of compressed air sealed between its outer side surfaces and the inner surfaces of the surrounding tunnel, thereby to provide an air-lubricated condition which will substantially eliminate friction between the vehicle and tunnel at high speeds and thus will reduce the resistance to motion to a negligible value.

In attaining this object simultaneously with the foregoing one, it is contemplated that the air drawn in from ahead of the vehicle will, in addition to being expelled rearwards, simultaneously be directed radially outwards into suitable longitudinal grooves, or the like, extending along the outer periphery of the vehicle.

A further specific object is to provide an improved propulsion means for a tubular conveyance system of the contemplated type, and more specifically a propulsion system of the so-called ramjet type.

The ramjet, also known as the stato-reactor, is recognized as constituting probably the most efficient means of high-speed propulsion so far devised for aircraft. According to an important aspect of this invention, the ramjet principle is transposed to a tubular conveyance system of the type here envisioned, advantage being taken of the fact that when air is withdrawn from a point ahead of the vehicle and expelled to the rear of it, as is done according to this invention for eliminating the objectionable ram effect noted above, the resulting system can very advantageously be converted to a propulsion system operating on the ramjet principle, by heating the compressed air flow and/or injecting into it an amount of boost energy such as that provided by the combustion gases from a suitable fuel mixture prior to expelling it rearward of the vehicle.

The above and further objects, features and advantages of the invention will be made clear as the disclosure proceeds with reference to the accompanying exemplary drawings, wherein:

FIG. 1 is a schematic longitudinal section through a novel conveyance system showing a segment of tunnel with a vehicle therein;

FIG. 2 is a schematic cross section on line II—II of FIG. 1;

FIG. 3 is a further simplified longitudinal section, on a smaller scale, illustrating a modified form of the system;

FIG. 4 is a schematic longitudinal section through a modified section of the tunnel of FIG. 1.

Referring first to FIGS. 1 and 2, there is shown at 1 a continuous generally horizontal cylindrical tube or tunnel, which may either be bored underground at any desired depth, or may be provided in the form of a length of tubing, continuous or in sections, of suitably large diameter, desirably positioned in a continuous trench-like excavation of the ground, or laid upon the surface of the ground, or through a body of water. In fact the tube 1 may assume any of these various forms in various sections throughout its extent.

Positioned within this tunnel or tube 1 is a vehicle 2 which in the embodiment of FIG. 1 is shown as a single rigid unit of generally cylindrical cross section somewhat smaller in diameter than the tunnel as shown in FIG. 2 and formed with a generally fluted outer surface defining longitudinal grooves 11 therein extending short of the ends of the vehicle, as shown, for a purpose to appear later. The forward end of this vehicle is formed with a funnel-like air intake 3 from the center of which extends an axial passage 4. Interposed in this passage within the body of the vehicle is a rotary suction fan diagrammatically indicated by block 5 which in turn is followed by a compressor and heater unit 7. There is further shown a boost motor unit 6 which is adapted to inject additional energy into the airflow within compressor and heater unit 7. From this latter unit the airflow in high-pressure, high-temperature conditions, and possibly charged with additional energy in the form of combustion gases from the motor 6 or in other suitable form, is passed through a distributor valve 8 of any suitable construction which directs it through the rear jet nozzles 9 to provide a propulsive jet for the vehicle and also directs an adjustable proportion of the flow through radial ducts 10, here shown three in number, which deliver into some of the peripheral grooves 11 mentioned above, to provide an annular cushion of high-pressure gaseous lubricant between the vehicle and tunnel. The radial ducts 10 instead of leading to the rear end part of the annular space as shown may be arranged to lead to other parts of said annular space. Since the gaseous lubricating effect is possible only at relatively high speeds when high-pressure ram air is available from the funnel 3 and when the linear velocity is sufficient to develop the viscosity of compressed air effectively to float and center the vehicle in its tube, means are preferably provided on the outer surface of the vehicle for engagement with the tunnel surface, and such means may assume the form of wheels, skates, or the like. These are diagrammatically indicated at 13 in the embodiment of FIG. 3.

In the modified embodiment of FIG. 3 the vehicle is shown consisting of a plurality, herein four, sections interconnected by flexible sealed coupling means 12, e.g. in the form of bellows. In such case the forward section 2a of the segmental vehicle would be formed as the front portion of the vehicle in FIG. 1, and the rearmost section 2d as the rear portion of the vehicle in FIG. 1. In the intermediate sections such as 2b and 2c, the peripheral flutes or grooves 11 extend throughout the length of the outer periphery so as to define an uninterrupted sealed annular space with the flutes in the end sections 2a and 2d, which are respectively interrupted short of the front end of the forward section and short of the rear end of the rear section.

In operation, it will be understood that the motor 6 would be used primarily for starting purposes until a predetermined high speed has been attained, whereupon it may be cut off and the flow rate and pressure of the ram air from funnel 3 will then be so large that the heating of it in heater 7 will be sufficient to ensure the necessary thrust for maintaining the desired speed. The boost motor would likewise be operated for effecting changes in speed. At high speeds moreover the viscosity of the annular mass of compressed, heated, air maintained in the annular sealed space defined by the grooves 11 will hold the vehicle in a centered, floating condition within the tube thereby reducing friction to a negligible degree. Accordingly, the wheels or other engaging means such as 13 are preferably made retractible and are retracted on attainment of a predetermined high speed of motion. Auxiliary starting motor means of any conventional character may be provided if desired.

The motor 6 may assume any desired form, e.g. combustion or nuclear.

Further aspects of the invention now to be described are directed to features involving the tube or tunnel 1 rather than the vehicle itself, in a tubular conveyance system of this kind.

Tests have shown that in such a tubular conveyance system, the motion of the ram-like vehicles in tubular tunnels of great length is liable to generate travelling and/or standing waves of pneumatic energy along the tunnel, producing local areas of high pressure and vacuum in different portions of the tunnel with objectionable results. It is among the objects of the invention to prevent this condition. For this purpose, there are provided as shown in FIG. 4 retractible bulkheads 14 or diaphragms across selected sections of the tunnel 1, which are normally extended across the tunnel and which can be automatically retracted to a position indicated by the first bulkhead 14' ahead of an approaching vehicle to allow it to pass, and then automatically moved back to their sealing position. Such automatic control of the bulkheads 16 may be operated by electromagnetic means 15 or by other means responsive to the approach of the vehicle as will readily be understood by those familiar with the arts involved. Between adjacent bulkheads 14 suction fans 16 are installed for maintaining a low pressure therein. The positions of the retractible bulkheads 14 and fans 16 may preferably be so predetermined as to correspond substantially to the positions of maximum vacuum and maximum pressure respectively, i.e. to the antinodes and nodes of a standing wave system.

It is further noted that the provision of the normally sealed, retractible bulkheads 14 and the associated fans 16 will substantially facilitate ventilation of the tunnel.

Furthermore, in connection with the annular cushion of high-pressure and heated air which at high speeds is present in the sealed annular space surrounding the moving vehicle, as described above, means are provided in the tunnel for discharging this air progressively and for maintaining a uniform pressure throughout the length of the vehicle. For this purpose, the wall of the tunnel 1, as shown in FIG. 1, may be formed with peripherally and longitudinally spaced discharge orifices 17 along its length. Such orifices are normally closed by diaphragms 18 or the like, and means 19 are provided for automatically opening each of the diaphragms 18 of the orifices 17 in sequence as the vehicle moves past it, and then closing it again when the vehicle has past beyond it. This automatic operation of the discharge orifices may be effected by any suitable means, e.g. by valves actuated by the pneumatic pressure in the annular space and is preferably effected in a gradual manner so that each orifice is fully open only as it is approached by the rear end of the sealed space defined by the moving vehicle, in order to achieve a substantially uniform pressure along the length thereof.

It will be seen that there has thus been provided a novel high-speed conveyance system which has many outstanding advantages. It will be able to reach speeds much higher than those of present-day railroads, and extending well into the range now attained only by aircraft, while possessing a degree of safety unparalleled either by air or surface transport of the present day. The teaching according to the invention of drawing in air from a point of the tunnel ahead of the vehicle and discharging it behind (and preferably also radially outwards), simultaneously solves a difficulty inherent and specific to this particular type of conveyance system, namely the ram effect of high-pressure air formed ahead of the vehicle and opposing its motion, an effect present to such a degree in no other system of transportation, and at the same time makes possible the convenient application to such a system of the (at high speeds) highly efficient ramjet principle as a means of propulsion therefor, as well as making it possible to bring down to an extremely low value the amount of power required to maintain high-speed motion through the use of a fraction of the said ram air to center and "float" the vehicle in an annular air cushion which almost totally eliminates friction.

What I claim is:

1. In a conveyance system, in combination, means defining a continuous tunnel, a vehicle movable in the tunnel in substantially sealing relation with the inner tunnel surface, recessed means in the outer surface of the vehicle along a major part of the length thereof to define a substantially sealed annular space between the vehicle and tunnel surfaces, discharge orifices spaced along the wall of the tunnel discharging ram air from said sealed annular space, an air inlet in a forward end of the vehicle, means in the vehicle for boosting the energy content of ram jet air entering said inlet at high vehicle speeds, means for discharging at least a major portion of the thus boosted ram air rearwardly of the vehicle as a propulsive jet, and means for discharging a fraction of said ram air into said sealed annular space to floatingly center the vehicle in the tunnel.

2. In the system claimed in claim 1 discharge orifices spaced along the tunnel wall, means normally sealing said orifices and means for automatically and progressively opening said orifices in sequence as a vehicle moves past to discharge said ram air from said sealed annular space and for thereafter closing the orifices.

3. In a conveyance system, in combination, means defining a continuous tunnel, a vehicle movable in the tunnel and conforming in outer cross sectional contour with the inner contour of the tunnel, an air inlet in the forward end of the vehicle, power boosting means in the vehicle for increasing the energy content of ram air entering said inlet, and means for discharging the boosted ram air rearward of the vehicle to develop a propulsive thrust, in combination with retractable bulkheads at selected points along the length of the tunnel, means normally positioning said bulkheads in sealing position across the tunnel, and means responsive to the approach of a vehicle for retracting the bulkheads to allow the vehicle to pass.

4. In the system claimed in claim 3, suction fans connected with a section of said tunnel intermediate a pair of bulkheads for maintaining a reduced pressure in said tunnel section.

5. In a conveyance system, in combination, means defining a continuous tubular tunnel, a vehicle in the tunnel and conforming in cross-sectional contour therewith recessed means in the outer surface of the vehicle defining a sealed annular space between the vehicle and tunnel surfaces an air inlet in a forward end of the vehicle, boosting means in the vehicle for increasing the energy content of ram air entering the inlet at high vehicle speeds, means for discharging at least a major portion of the boosted ram air rearward of the vehicle to develop propulsive thrust and for discharging a fraction of said ram air radially outward into said annular space to provide an annular cushion of compressed air between the adjacent surfaces of the tunnel and the vehicle to floatingly center the vehicle in the tunnel, in combination with retractible means on the vehicle engageable with the tunnel surface for centering the vehicle therein.

References Cited in the file of this patent
UNITED STATES PATENTS

| | | |
|---|---|---|
| 1,053,368 | Eells | Feb. 8, 1913 |
| 1,336,732 | Davy | Apr. 13, 1920 |
| 2,511,979 | Goddard | June 20, 1950 |
| 2,514,875 | Kollsman | July 11, 1950 |
| 2,717,744 | Birnbaum | Sept. 13, 1955 |
| 2,864,318 | Toulmin | Dec. 16, 1958 |

FOREIGN PATENTS

| | | |
|---|---|---|
| 966,602 | France | Mar. 8, 1950 |

OTHER REFERENCES

A Text Book of Physics, by L. B. Spinney, published by The Macmillan Co., N.Y., 1920, pp. 152 to 156.